UNITED STATES PATENT OFFICE.

JOHN W. MUNGER, OF PORTLAND, MAINE.

IMPROVEMENT IN DETERGENT COMPOSITIONS.

Specification forming part of Letters Patent No. 170,183, dated November 23, 1875; application filed July 16, 1874.

*To all whom it may concern:*

Be it known that I, JOHN W. MUNGER, of Portland, in the county of Cumberland and State of Maine, have invented and made a certain new and useful Composition of Matter, of which the following is a specification:

The ingredients required to produce this new composition, and the mode of manufacturing the same, are particularly set forth below, viz:

To make the first quantity, take two ounces (2 oz.) of fused crystallized sulphate of soda; eight ounces (8 oz.) of silex; eight pounds (8 lbs.) of white castile-soap, pulverized; one ounce (1 oz.) of arrow-root; four ounces (4 oz.) of borax; two gills (2 gi.) of rock-salt.

Dissolve the above-named ingredients in eight gallons (8 galls.) of hot water, nearly boiling, and, when thoroughly dissolved, add three pounds (3 lbs.) of sal-soda, dissolved in hot water. Then, when the mixture has cooled, drain off the water, if any there be, through a thin cloth strainer, place the mixture in a boiler over a slow fire, and boil it fifteen minutes, (15 min.,) and when partially cool it may be drawn off into the various packages designed for sale.

This compound will restore and cleanse all woven or felt fabrics, or kid gloves, which may be soiled by grease, oils, pitch, paint, and other like substances, without injuring or changing fast colors, and without injuring the goods to which it is applied.

The directions for using the compound are as follows, viz: Apply enough of the compound to thinly cover the soiled part, rubbing in gently with a small sponge or the fingers, and then wash off clean with a sponge or cloth dipped in tepid or cold water.

For coat-collars, felt goods, carpets, and other coarse fabrics, use a stiff nail-brush or tooth-brush in applying the compound.

To clean kid gloves, apply, with glove on the hand, as little of the compound as will be necessary to do the required work, rubbing quickly with a moistened sponge. Then wash off with a clean damp sponge, and allow the glove to dry on the hand. Be careful to squeeze the sponge as dry as possible before each use.

I claim—

The compound composed of the following-named ingredients, to wit: fused crystallized sulphate of soda, silex, pulverized white castile-soap, arrow-root, borax, rock-salt, water, and sal-soda, in the proportions and for the purposes specified.

JOHN W. MUNGER.

Witnesses:
 ALFRED HASKELL,
 PHIL. F. TURNER.